United States Patent
Smith et al.

(10) Patent No.: US 12,383,965 B2
(45) Date of Patent: Aug. 12, 2025

(54) CHAMFER-CUTTING TOOLS

(71) Applicant: The Boeing Company, Chicago, IL (US)

(72) Inventors: Matthew W. Smith, Puyallup, WA (US); David L. Phillips, Buckley, WA (US); Matthew C. Meneghel, Tacoma, WA (US); Cody S. Conant, Puyallup, WA (US)

(73) Assignee: The Boeing Company, Arlington, VA (US)

( * ) Notice: Subject to any disclaimer, the term of this patent is extended or adjusted under 35 U.S.C. 154(b) by 195 days.

(21) Appl. No.: 17/958,964

(22) Filed: Oct. 3, 2022

(65) Prior Publication Data

US 2024/0109136 A1    Apr. 4, 2024

(51) Int. Cl.
*B23C 3/12* (2006.01)
*B23Q 9/00* (2006.01)

(52) U.S. Cl.
CPC ............ *B23C 3/126* (2013.01); *B23Q 9/0028* (2013.01); *B23C 2220/16* (2013.01); *B23C 2220/40* (2013.01); *Y10T 409/304144* (2015.01); *Y10T 409/306496* (2015.01); *Y10T 409/308624* (2015.01)

(58) Field of Classification Search
CPC . B23C 3/126; B23C 2220/16; B23C 2210/56; B23C 3/12–3/128; B23C 2220/40; Y10T 409/306496; Y10T 409/304144; Y10T 409/308176; Y10T 409/3084; Y10T 409/308624; B23Q 9/0028; B23Q 9/0071

USPC ...... 409/180, 138, 210, 214, 218; 144/253.3
See application file for complete search history.

(56) References Cited

U.S. PATENT DOCUMENTS

| | | | | |
|---|---|---|---|---|
| 2,726,690 A | * | 12/1955 | Schacher | B23C 3/126 409/180 |
| 4,946,323 A | * | 8/1990 | Kazama | B23C 3/126 409/180 |
| 4,960,352 A | * | 10/1990 | Kishi | B23C 3/126 409/180 |
| 4,964,765 A | * | 10/1990 | Kishi | B23C 3/126 409/218 |
| 5,004,385 A | * | 4/1991 | Kishi | B23C 3/126 409/180 |

(Continued)

FOREIGN PATENT DOCUMENTS

DE    9306249 U1 * 10/1993
JP    63-256306 A * 10/1988

(Continued)

OTHER PUBLICATIONS

Machine Translation of JP 03-161210 A, which JP '210 was published Jul. 1991.*

(Continued)

*Primary Examiner* — Erica E Cadugan
(74) *Attorney, Agent, or Firm* — Kolitch Romano Dascenzo Gates LLC

(57) ABSTRACT

Chamfer-cutting tool kits comprise a cutter, a bushing, an upper-edge guide block, and a lower-edge guide block, and are configured to be selectively assembled into an upper-chamfer configuration for cutting an upper chamfer and into a lower-chamfer configuration for cutting a lower chamfer.

20 Claims, 9 Drawing Sheets

(56) References Cited

U.S. PATENT DOCUMENTS

| | | | | |
|---|---|---|---|---|
| 6,733,216 B2* | 5/2004 | Bohringer | ............... | B23C 3/126 409/138 |
| 7,635,242 B2* | 12/2009 | Jeon | ........................ | B23C 3/126 409/218 |
| 7,713,005 B2* | 5/2010 | Rieth | ...................... | B23C 3/126 407/66 |
| 2003/0039517 A1* | 2/2003 | Golding, III | ............ | B23C 3/126 409/180 |
| 2019/0299303 A1* | 10/2019 | Yabuta | ...................... | B23C 3/12 |
| 2021/0268592 A1* | 9/2021 | Rieth | ...................... | B23C 3/126 |

FOREIGN PATENT DOCUMENTS

| | | | |
|---|---|---|---|
| JP | 03-161210 A | * | 7/1991 |
| JP | 08-085011 A | * | 4/1996 |
| KR | 10-1740864 B1 | * | 5/2017 |

OTHER PUBLICATIONS

Machine Translation of JP 08-085011-A, which JP '011 was published Apr. 1996.*

* cited by examiner

CHAMFER-CUTTING TOOLS

FIELD

The present disclosure relates to chamfer-cutting tools.

BACKGROUND

Chamfers are utilized for various reasons across various manufacturing industries. In the aerospace industry, as an example, I-beam-shaped stringers may be used in the construction of skin assemblies for horizontal stabilizers and vertical fins of aircraft. In some modern aircraft, these stringers are fabricated from a carbon fiber and an epoxy resin system. After cure, each stringer is trimmed to its engineered shape. FIG. 1 schematically represents an I-beam stringer 150 having a cap 152, a base 156, and a web 154 extending between the cap 152 and the base 156. The sharp edges of the cap 152 and the base 156 typically are chamfered to deburr the edges. In some applications, a peel ply 21 is applied to the upper face 14 of the cap 152, which peel ply 21 may result in extraneous fibers, or fuzz, extending from the cap 152 as a result of the trimming process and needing to be removed. A given horizontal stabilizer skin assembly or vertical fin skin assembly will use numerous stringers. These stringers range in length, shape, and configuration according engineering requirements. In particular, while the base 156 generally may be uniform across numerous I-beam stringers, the cap 152 often varies in thickness and width for various engineering requirements. As an example, the cap 152 may comprise one or more tab-outs 17, in which the cap 152 is wider than adjacent regions of the cap 152. These changes in width of the cap 152 may be significant along a single I-beam stringer, such as ranging from as small as 1 centimeter (cm) or smaller to as large as 12 cm or larger.

Currently, deburring I-beam stringer caps and bases is performed by hand using sanding blocks. All eight edges are deburred using this manual process, which is time-consuming and may result in inconsistent edge profiles. Accordingly, there is a need for specialized tools to cut chamfers on I-beam stringers in the aerospace industry.

SUMMARY

Chamfer-cutting tools and chamfer-cutting tool kits are disclosed herein.

Chamfer-cutting tools comprise a cutter and bushing. Some chamfer-cutting tools are for cutting an upper chamfer between an upper face of a workpiece and an edge face of the workpiece and further comprise an upper-edge guide block comprising an upper-face guide surface that is configured to engage the upper face of the workpiece. Some chamfer-cutting tools are for cutting a lower chamfer between a lower face of a workpiece and an edge face of the workpiece adjacent to the lower face and further comprise a lower-edge guide block comprising a lower-face guide surface configured to engage the lower face of the workpiece. Chamfer-cutting tool kits comprise a cutter, a bushing, an upper-edge guide block, and a lower-edge guide block, and are configured to be selectively assembled into an upper-chamfer configuration for cutting an upper chamfer and into a lower-chamfer configuration for cutting a lower chamfer.

DESCRIPTION

Figure 1:
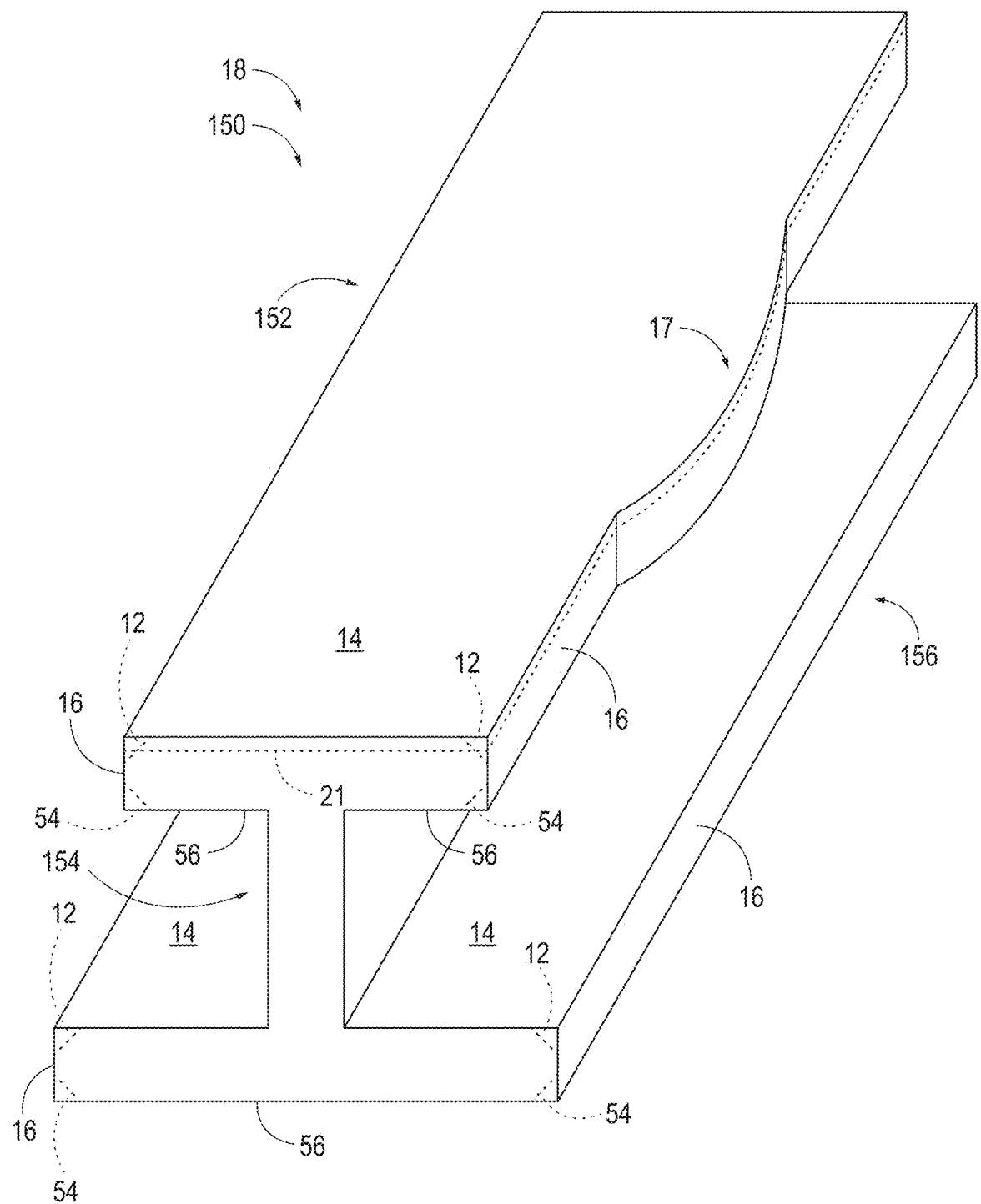
FIG. 1 illustrates an example workpiece.
Figure 2:
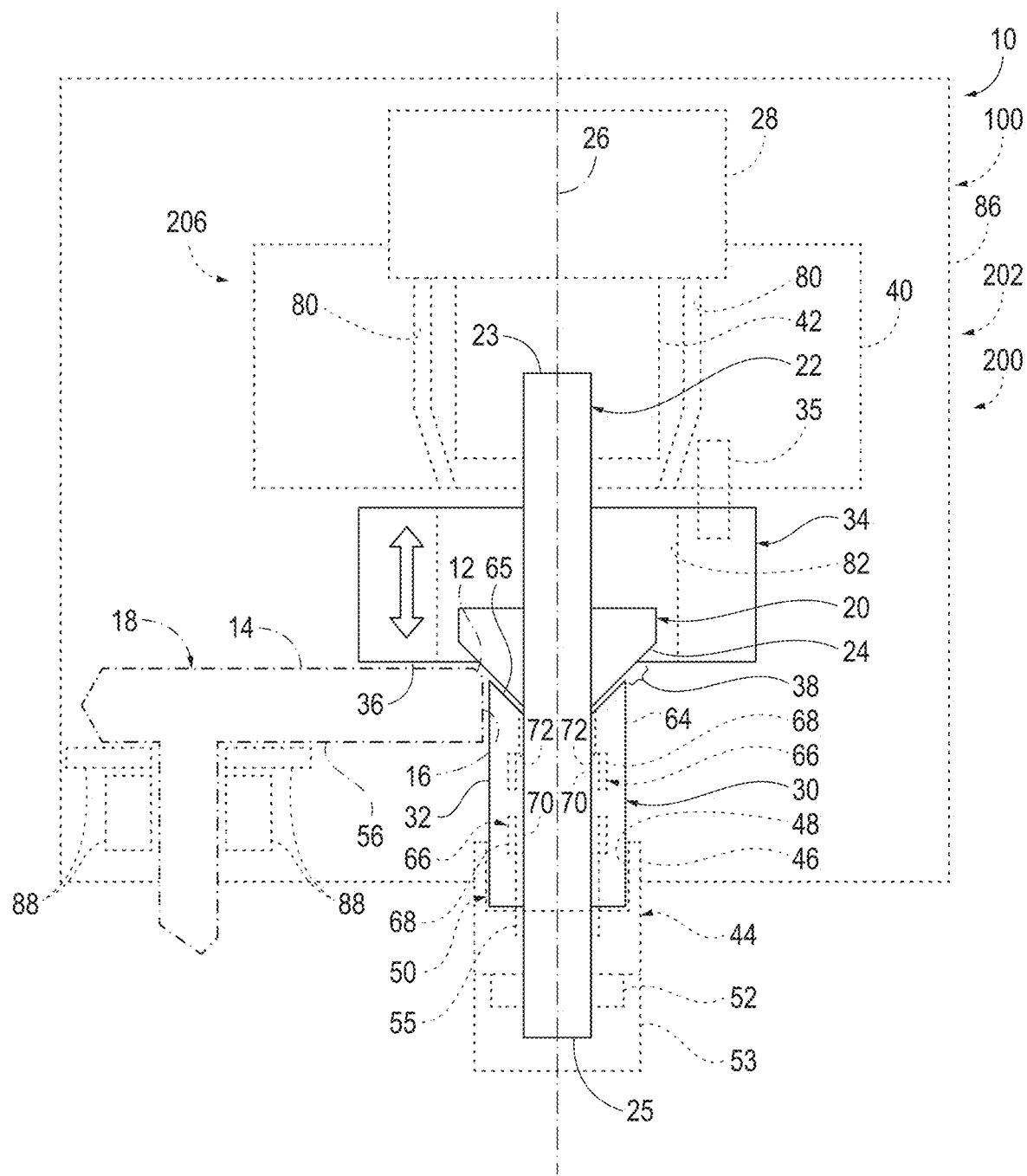
FIG. 2 is a schematic illustration representing example chamfer-cutting tools.
Figure 3:
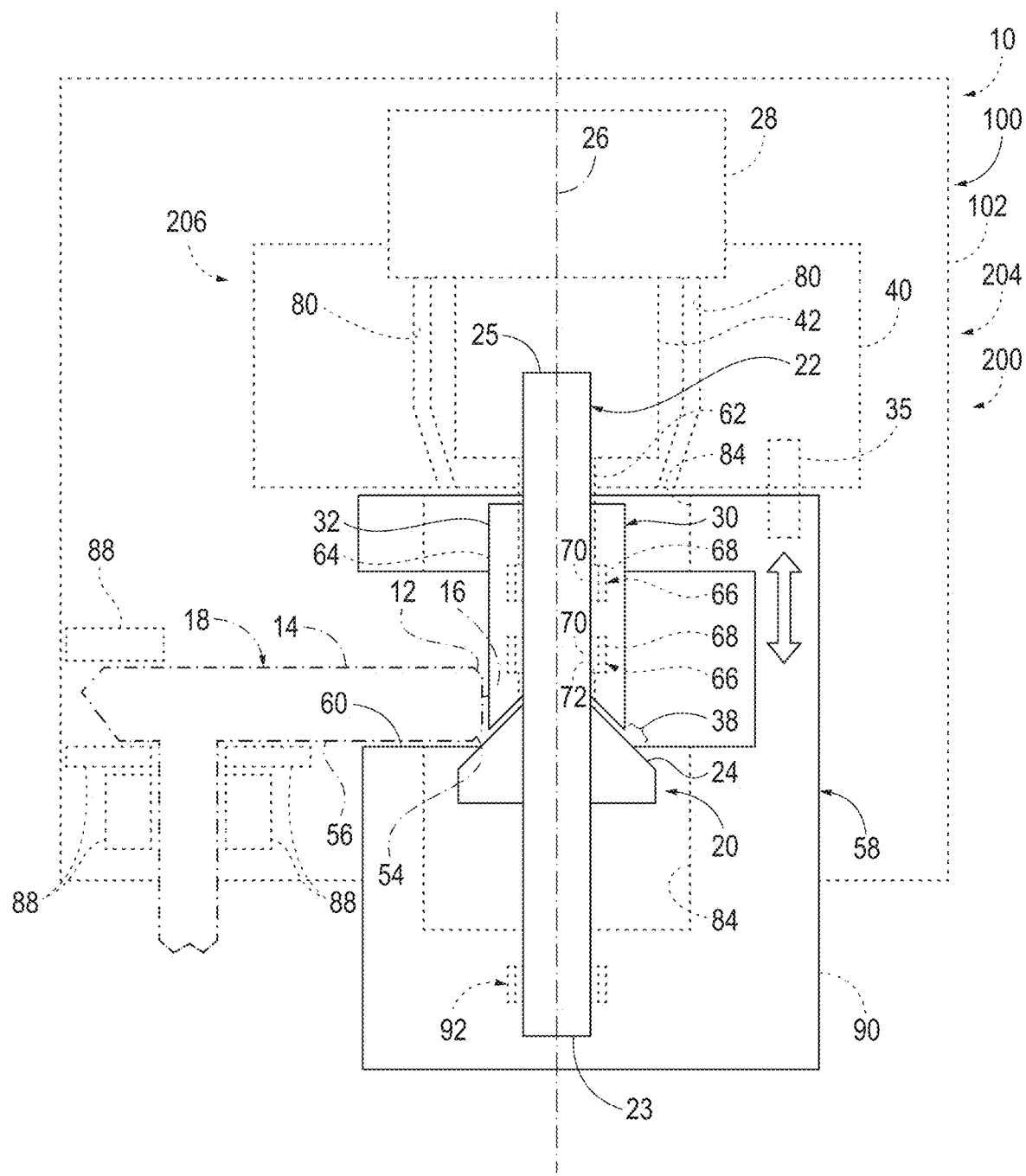
FIG. 3 is another schematic illustration representing example chamfer-cutting tools.

Chamfer-cutting tools and chamfer-cutting tool kits for assembling chamfer-cutting tools are disclosed herein. With reference also to FIG. 1, FIG. 2 schematically represents chamfer-cutting tools 10 that are configured for cutting an upper chamfer 12 between an upper face 14 of a workpiece 18 and an edge face 16 of the workpiece 18 adjacent to the upper face 14. FIG. 3 schematically represents chamfer-cutting tools 100 that are configured for cutting a lower chamfer 54 between a lower face 56 of a workpiece 18 and an edge face 16 of the workpiece 18 adjacent to the lower face 56. Chamfer-cutting tools 10 and chamfer-cutting tools 100 may share common parts and be assembled from chamfer-cutting tool kits 200. That is, a chamfer-cutting tool 10 may be assembled from a chamfer-cutting tool kit 200 into an upper-chamfer configuration 202, as schematically represented in FIG. 2, and a chamfer-cutting tool 100 may be assembled from the same chamfer-cutting tool kit 200 into a lower-chamfer configuration 204, as schematically represented in FIG. 3. Generally, in FIGS. 2 and 3, elements that are likely to be included in a given example are illustrated in solid lines, while elements that are optional or correspond to an alternative example are illustrated in dashed lines. An example workpiece 18 is schematically illustrated in dash-dot lines as environment to the schematically represented chamfer-cutting tools 10 and 100. However, elements that are illustrated in solid lines are not essential to all examples of the present disclosure, and an element shown in solid lines may be omitted from a particular example without departing from the scope of the present disclosure.

Starting with FIG. 2, chamfer-cutting tools 10 comprise at least a cutter 20, a bushing 30, and an upper-edge guide block 34. The cutter 20 comprises a shaft 22 and a conical cutting surface 24. The shaft 22 comprises a first end 23 and a second end 25 opposite the first end 23. The shaft 22 defines a cutter rotation axis 26 and is configured to be operatively coupled to a motor 28 at the first end 23 of the shaft 22. For example, chamfer-cutting tools 10 may be configured for use with a motor 28, a housing 40 that supports the motor 28, and a chuck 42 that is operatively coupled to the motor 28 for selective and operative engagement of the shaft 22 for operative rotation of the cutter 20 by the motor 28. Some chamfer-cutting tools 10 comprise the motor 28, the housing 40, and the chuck 42, which collectively may be described as a router 206, and some such examples may be configured specifically for operative use with the upper-edge guide block 34 of a chamfer-cutting tool 10. However, it also is within the scope of the present disclosure that a chamfer-cutting tool 10 comprising at least a cutter 20, a bushing 30, and an upper-edge guide block 34 may be used with an off-the-shelf, or other, motorized tool, such as a router. The motor 28 and a corresponding motorized tool may be powered electrically and/or pneumatically, as examples. The chuck 42 may take any suitable form configured to selectively couple to the shaft 22 of the cutter 20, including so-called drill chucks, collet chucks, and the like.

The bushing 30 of a chamfer-cutting tool 10 is rotatably coupled to the shaft 22 between the conical cutting surface 24 and the second end 25 of the shaft 22. The bushing 30 comprises an outer cylindrical contact surface 32 configured to engage and operatively roll along the edge face 16 of a workpiece 18. In some examples, an edge face 16 having a height, or thickness, as small as 1.5 millimeter (mm) or even smaller may be engaged by the outer cylindrical contact surface 32 and have the chamfer-cutting tool 10 operatively cut the desired upper chamfer 12.

The upper-edge guide block 34 of a chamfer-cutting tool 10 comprises an upper-face guide surface 36 that is configured to engage the upper face 14 of a workpiece 18. In addition, the upper-edge guide block 34 is configured to be selectively positioned along the cutter rotation axis 26 relative to the conical cutting surface 24 of the cutter 20 and relative to the outer cylindrical contact surface 32 of the bushing 30 to selectively define a chamfer cutting region 38 of the conical cutting surface 24 between the upper-face guide surface 36 and the outer cylindrical contact surface 32 of the bushing 30.

Accordingly, the size, or depth, of the chamfer cutting region 38, and thus the resulting upper chamfer 12, may be selectively adjusted. In particular, upper chamfers 12 as small as 0.125 mm or even smaller in height and/or width may be accomplished with chamfer-cutting tools 10.

To facilitate the adjustment of the size of an upper chamfer 12, a chamfer-cutting tool 10 may further comprise an adjustment mechanism 35 that is configured to operatively adjust a position of the upper-edge guide block 34 along the cutter rotation axis 26, such as by being operatively coupled between the upper-edge guide block 34 and a housing 40. Any suitable adjustment mechanism 35 configured to permit for selective and operative translation of the upper-edge guide block 34 relative to the cutter 20 may be utilized and incorporated into a chamfer-cutting tool 10. As an example, an adjustment mechanism 35 may comprise or take the form of a ball lock screw assembly.

In some examples, the upper-edge guide block 34 defines an upper-edge guide-block passage 82, and when present, the cutter 20 extends through the upper-edge guide-block passage 82. Accordingly, the upper-face guide surface 36 of the upper-edge guide block 34 may extend partially or even fully around the cutter 20, thereby permitting the chamfer-cutting tool 10 to be rotationally positioned about the cutter rotation axis 26 in multiple positions and still be functional with the upper-face guide surface 36 able to operatively engage and slide along the upper face 14 of a workpiece 18. Moreover, chamfer-cutting tools 10 may be utilized with workpieces 18 having an edge face 16 that has varying features, such as tab-outs 17, with the upper-face guide surface 36 remaining in operative and sliding engagement with the upper face 14 of a workpiece 18 as the chamfer-cutting tool 10 is translated along a length of the workpiece 18.

In some examples, the upper-edge guide block 34 is freely rotatably coupled relative to the motor 28. That is, the upper-edge guide block 34 may freely rotate relative to the motor 28, the cutter 20, and at least a portion of the housing 40. As a result, when a chamfer-cutting tool 10 is translated along the length of a workpiece 18, the upper-edge guide block 34 is permitted to freely rotate while the upper-face guide surface 36 remains in operative engagement with an upper face 14 of the workpiece 18.

In some examples, the bushing 30 comprises a bushing body 64 and at least one bushing roller bearing 66. Any suitable number of bushing roller bearings 66 may be utilized, including one, two, or more than two bushing roller bearings 66, such that the bushing roller bearing(s) 66 provide sufficient stability for operative and smooth rotation of the shaft 22 of the cutter 20 within the bushing 30. Each bushing roller bearing 66 typically comprises an outer race 68 that is engage with the bushing body 64 and an inner race 70 that is engaged with the shaft 22 of the cutter 20. As schematically illustrated in FIG. 2, in some examples, the cutter 20 defines a shoulder 72 that engages the inner race 70 of at least one bushing roller bearing 66 to prevent the conical cutting surface 24 from engaging the bushing body 64. Accordingly, the cutter 20 is free to rotate relative to the bushing without engagement with the conical cutting surface 24 and with the inner race 70 being the only contact with the cutter 20. As illustrated in FIG. 2, in some examples, the bushing body 64 defines a conical surface 65 that is parallel to the conical cutting surface 24 of the cutter 20, thereby permitting the bushing 30 to be positioned in very close proximity to the conical cutting surface 24 without engagement with the conical cutting surface 24.

With continued reference to FIG. 2, some chamfer-cutting tools 10 further comprise a bushing retainer 44 that is operatively coupled to the shaft 22 and that is configured to retain the bushing 30 in a fixed positioned along the cutter rotation axis 26 relative to the cutter 20. For example, the bushing retainer 44 may comprise a retainer body 46 that defines a bushing cavity 48 that is sized to receive a lower portion 50 of the bushing 30. The bushing retainer 44 may further comprise a retainer nut 52 that is operatively coupled with the shaft 22 of the cutter 20 and that is configured to urge the retainer body 46 against the bushing 30 and thereby urge the bushing 30 toward the cutter 20. As a result, the bushing retainer 44 rotates with the cutter 20 relative to the bushing body 64. In some examples, a sleeve 55 is provided that is configured to position the bushing retainer 44 relative to the bushing 30. In particular. The sleeve 55 is engaged with the inner race 70 of a bushing roller bearing 66 of the bushing 30 and is sized to space the bushing retainer 44 away from the bushing body 64.

Some such examples of chamfer-cutting tools 10 further comprise a cover 53 that is configured to be selectively positioned over the second end 25 of the shaft 22 of the cutter 20 and coupled to the bushing retainer 44, such as the retainer body 46 thereof. When present, the cover 53 restricts material removed from a workpiece 18 from becoming wrapped around the second end 25 of the shaft 22 of the cutter 20. For example, when a workpiece 18 has a peel ply 21 constructed of a fabric, the fibers of the peel ply may not be cut by the cutter, thus resulting in lengthy strands of fibers that could otherwise wrap-around or tangle with the cutter 20.

As schematically illustrated in FIG. 2, in some examples, the housing 40 defines one or more air passages 80 that are configured to direct airflow from the motor 28 toward the workpiece 18. For example, the motor 28 may be a pneumatically actuated motor, and the airflow may be utilized to disperse material removed from the workpiece 18 during operative use of a chamfer-cutting tool 10. For example, and as schematically represented in FIG. 2, the one or more air passages 80 may be configured to direct airflow from the motor 28 into the upper-edge guide-block passage 82 of the upper-edge guide block 34.

As also schematically illustrated in FIG. 2, some chamfer-cutting tools 10 further comprise a frame 86 that is configured to operatively support the housing 40 to operatively position the chamfer-cutting tool 10 relative to the workpiece 18. For example, the frame 86 may provide structure, such as handles or other structures, that facilitate manipulation of the chamfer-cutting tool 10 by a user and/or by a robotic assembly. In addition, the frame 86 may provide structure to operatively guide the chamfer-cutting tool 10 along a length of a workpiece 18 for cutting chamfers. In some examples, the frame 86 comprises one or more rollers 88 that are configured to operatively engage the workpiece 18 to maintain the conical cutting surface 24 in operative engagement with the workpiece 18. As examples, the rollers 88 may be configured for operative engagement with the lower face 56 of a workpiece 18 and/or with a vertical web 154 of a workpiece 18.

Turning now to FIG. 3, chamfer-cutting tools 100 similarly comprise at least a cutter 20 and a bushing 30 as described in detail above with respect to chamfer-cutting tools 10. However, rather than the upper-edge guide block 34 of a chamfer-cutting tool 10, chamfer-cutting tools 100 comprise a lower-edge guide block 58. Moreover, rather than the first end 23 of the shaft 22 of the cutter 20 being coupled to a motor 28, in chamfer-cutting tools 100, the second end 25 of the shaft 22 is operatively coupled to a motor 28. That is, the orientation of the cutter 20 is reversed in a chamfer-cutting tool 100 relative to a chamfer-cutting tool 10, and identically configured cutters 20 may be utilized with both a chamfer-cutting tool 10 and a chamfer-cutting tool 100. Similarly, identically configured bushings 30 may be utilized with both a chamfer-cutting tool 10 and a chamfer-cutting tool 100. Additionally, a single cutter 20 and a single bushing 30 may be utilized with either of a chamfer-cutting tool 10 or a chamfer-cutting tool 100.

Like chamfer-cutting tools 10, chamfer-cutting tools 100 may be configured for use with a motor 28, a housing 40 that supports the motor 28, and a chuck 42 that is operatively coupled to the motor 28 for selective and operative engagement of the shaft 22 for operative rotation of the cutter 20 by the motor 28. Some chamfer-cutting tools 100 comprise the motor 28, the housing 40, and the chuck 42. However, it also is within the scope of the present disclosure that a chamfer-cutting tool 100 comprising at least a cutter 20, a bushing 30, and an upper-edge guide block 34 may be used with an off-the-shelf, or other, motorized tool, such as a router.

As in chamfer-cutting tools 10, the bushing 30 of a chamfer-cutting tool 100 is rotatably coupled to the shaft 22 between the conical cutting surface 24 and the second end 25 of the shaft 22. However, unlike in chamfer-cutting tools 10, the bushing 30 of a chamfer-cutting tool 100 is positioned between the conical cutting surface 24 and the chuck 42. That is, in a chamfer-cutting tool 10, the bushing 30 is positioned distal to the chuck 42 relative to the conical cutting surface 24, while in a chamfer-cutting tool 100, the bushing 30 is positioned proximal to the chuck 42 relative to the conical cutting surface 24.

The lower-edge guide block 58 of chamfer-cutting tools 100 comprise a lower-face guide surface 60 that is configured to engage a lower face 56 of a workpiece 18. In particular, the lower-edge guide block 58 is configured to be selectively positioned along the cutter rotation axis 26 of the cutter's shaft 22 relative to the conical cutting surface 24 of the cutter 20 and relative to the outer cylindrical contact surface 32 of the bushing 30 to selectively define a chamfer cutting region 38 of the conical cutting surface 24 between the lower-face guide surface 60 and the outer cylindrical contact surface 32 of the bushing 30. Accordingly, the size, or depth, of the chamfer cutting region 38, and thus the resulting lower chamfer 54, may be selectively adjusted. In particular, lower chamfers 54 as small as 0.125 mm, or even smaller, in height and/or width may be accomplished with chamfer-cutting tools 100. Moreover, an edge face 16 having a height, or thickness, as small as 1.5 mm or even smaller may be engaged by the outer cylindrical contact surface 32 and have the chamfer-cutting tool 100 operatively cut the desired lower chamfer 54.

As with chamfer-cutting tools 10, to facilitate the adjustment of the size of a lower chamfer 54, a chamfer-cutting tool 100 may further comprise an adjustment mechanism 35 that is configured to operatively adjust a position of the lower-edge guide block 58 along the cutter rotation axis 26, such as by being operatively coupled between the lower-edge guide block 58 and a housing 40. Any suitable adjustment mechanism 35 configured to permit for selective and operative translation of the lower-edge guide block 58 relative to the cutter 20 may be utilized and incorporated into a chamfer-cutting tool 100, including, for example, a ball lock screw assembly.

In some examples, the lower-edge guide block 58 defines a lower-edge guide-block passage 84, and when present, the cutter 20 extends through the lower-edge guide-block passage 84. Accordingly, the lower-face guide surface 60 of the lower-edge guide block 58 may extend partially or even fully around the cutter 20, thereby permitting the chamfer-cutting tool 100 to be rotationally positioned about the cutter rotation axis 26 in multiple positions and still be functional with the lower-face guide surface 60 able to operatively engage and slide along the lower face 56 of a workpiece 18. Moreover, chamfer-cutting tools 100 may be utilized with workpieces 18 having an edge face 16 that has varying features, such as tab-outs 17, with the lower-face guide surface 60 remaining in operative and sliding engagement with the lower face 56 of a workpiece 18 as the chamfer-cutting tool 100 is translated along a length of the workpiece 18.

Like the upper-edge guide block 34 of chamfer-cutting tools 10, the lower-edge guide block 58 of chamfer-cutting tools 100 is freely rotatably coupled relative to the motor 28. That is, the upper-edge guide block 34 may freely rotate relative to the motor 28, the cutter 20, and at least a portion of the housing 40. As a result, when a chamfer-cutting tool 100 is translated along the length of a workpiece 18, the lower-edge guide block 58 is permitted to freely rotate while the upper-face guide surface 36 remains in operative engagement with a lower face 56 of the workpiece 18.

As in chamfer-cutting tools 10, the bushing 30 of a chamfer-cutting tool 100 may comprise a bushing body 64 and at least one bushing roller bearing 66 with an outer race 68 that is engaged with the bushing body 64 and an inner race 70 that is engaged with the shaft 22 of the cutter 20. Moreover, in some examples, a shoulder 72 of the cutter 20 engages with the inner race 70 of at least one bushing roller bearing 66 to prevent the conical cutting surface 24 from engaging the bushing body 64.

With continued reference to FIG. 3, some chamfer-cutting tools 100 further comprise a sleeve 62 that is configured to position the bushing 30 relative to a chuck 42, a motor 28, and/or a housing 40 of the chamfer-cutting tool 100. In particular, when present, the sleeve 62 engages the inner race 70 of a bushing roller bearing 66 to operatively position the bushing 30 relative to the chuck 42, the motor 28, and/or the housing 40 of the chamfer-cutting tool 100.

In some examples of chamfer-cutting tools 100, the lower-edge guide block 58 comprises a lower-edge guide-block body 90 and at least one lower-edge guide-block roller bearing 92 that rotatably couples the lower-edge guide-block body 90 to the shaft 22 of the cutter 20.

As with chamfer-cutting tools 10, in some examples of chamfer-cutting tools 100, the housing 40 defines one or more air passages 80 that are configured to direct airflow from the motor 28 toward the workpiece 18, such as through the lower-edge guide-block passage 84 to disperse material removed from the workpiece 18 during operative use of a chamfer-cutting tool 100.

Also like chamfer-cutting tools 10, chamfer-cutting tools 100 may further comprise a frame 102 that is configured to operatively support the housing 40 to operatively position the chamfer-cutting tool 100 relative to the workpiece 18. For example, the frame 102, like the frame 86 of chamfer-cutting tools 10, may provide structure, such as handles or other structures, that facilitate manipulation of the chamfer-cutting tool 100 by a user and/or by a robotic assembly. In addition, the frame 102 may provide structure to operatively guide the chamfer-cutting tool 100 along a length of a workpiece 18 for cutting chamfers. In some examples, the frame 102 comprises one or more rollers 88 that are configured to operatively engage the workpiece 18 to maintain the conical cutting surface 24 in operative engagement with the workpiece 18. As examples, the rollers 88 may be configured for operative engagement with one or more of the upper face 14, the lower face 56, or a vertical web 154 of a workpiece 18.

Now with reference to FIGS. 2-3 in tandem, a chamfer-cutting tool 10 may be reconfigurable to a chamfer-cutting tool 100, and a chamfer-cutting tool 100 may be reconfigurable to a chamfer-cutting tool 10. As discussed, the cutter 20 and the bushing 30, as well as the motor 28, the housing 40, and the chuck 42 may be identical between a chamfer-cutting tool 10 and a chamfer-cutting tool 100, and thus may be utilized with an upper-edge guide block 34 when configured to cut an upper chamfer 12 and may be utilized with a lower-edge guide block 58 when configured to cut a lower chamfer 54. Accordingly, also within the scope of the present disclosure are chamfer-cutting tool kits 200 that are configured to be selectively assembled into an upper-chamfer configuration 202 (FIG. 2) for cutting an upper chamfer 12 and be selectively assembled into a lower-chamfer configuration 204 (FIG. 3) for cutting a lower chamfer 54. Such chamfer-cutting tool kits 200 comprise at least a cutter 20, a bushing 30, an upper-edge guide block 34, and a lower-edge guide block 58, and optionally also a router 206 comprising a motor 28, a housing 40, and a chuck 42 as disclosed herein. Chamfer-cutting tool kits 200 also may comprise one or more of a frame 86, a frame 102, a bushing retainer 44, a sleeve 55, a cover 53, and a sleeve 62 as disclosed herein.

Turning now to FIGS. 4-9, illustrative non-exclusive examples of a chamfer-cutting tool 10 (FIGS. 4-6) and a chamfer-cutting tool 100 (FIGS. 7-9) are illustrated. Where appropriate, the reference numerals from the schematic illustrations of FIGS. 2-3 are used to designate corresponding parts of the examples of FIGS. 4-9; however, the examples of FIGS. 4-9 are non-exclusive and do not limit chamfer-cutting tools 10, chamfer-cutting tools 100, and/or chamfer-cutting tool kits 200 to the illustrated embodiments of FIGS. 4-9. For the purpose of brevity, each previously discussed component, part, portion, aspect, region, etc. or variants thereof may not be discussed, illustrated, and/or labeled again with respect to the examples of FIGS. 4-9; however, it is within the scope of the present disclosure that the previously discussed features, variants, etc. may be utilized with the illustrated examples.

Figure 4:
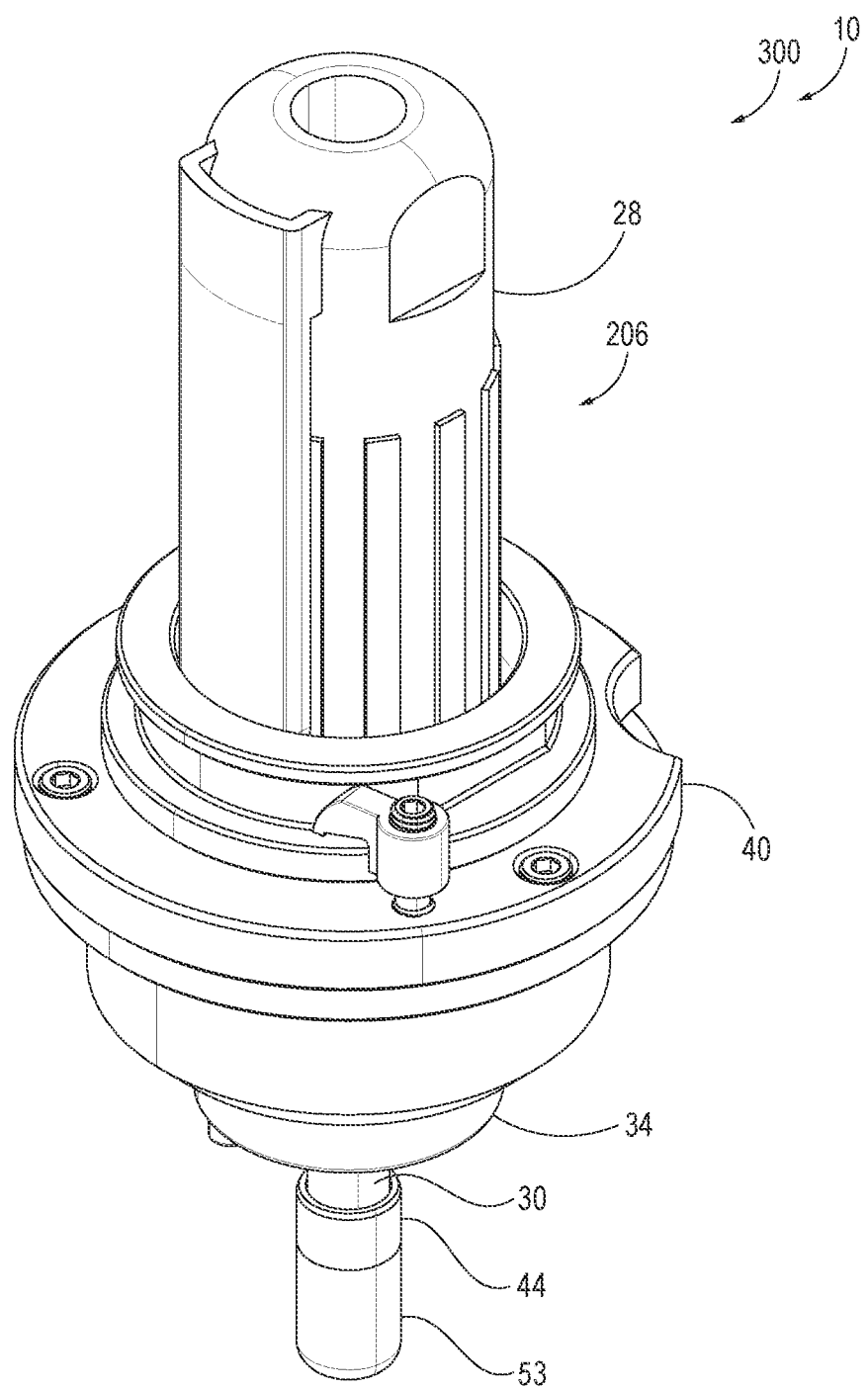
FIG. 4 is a perspective view of an example chamfer-cutting tool.
Figure 5:
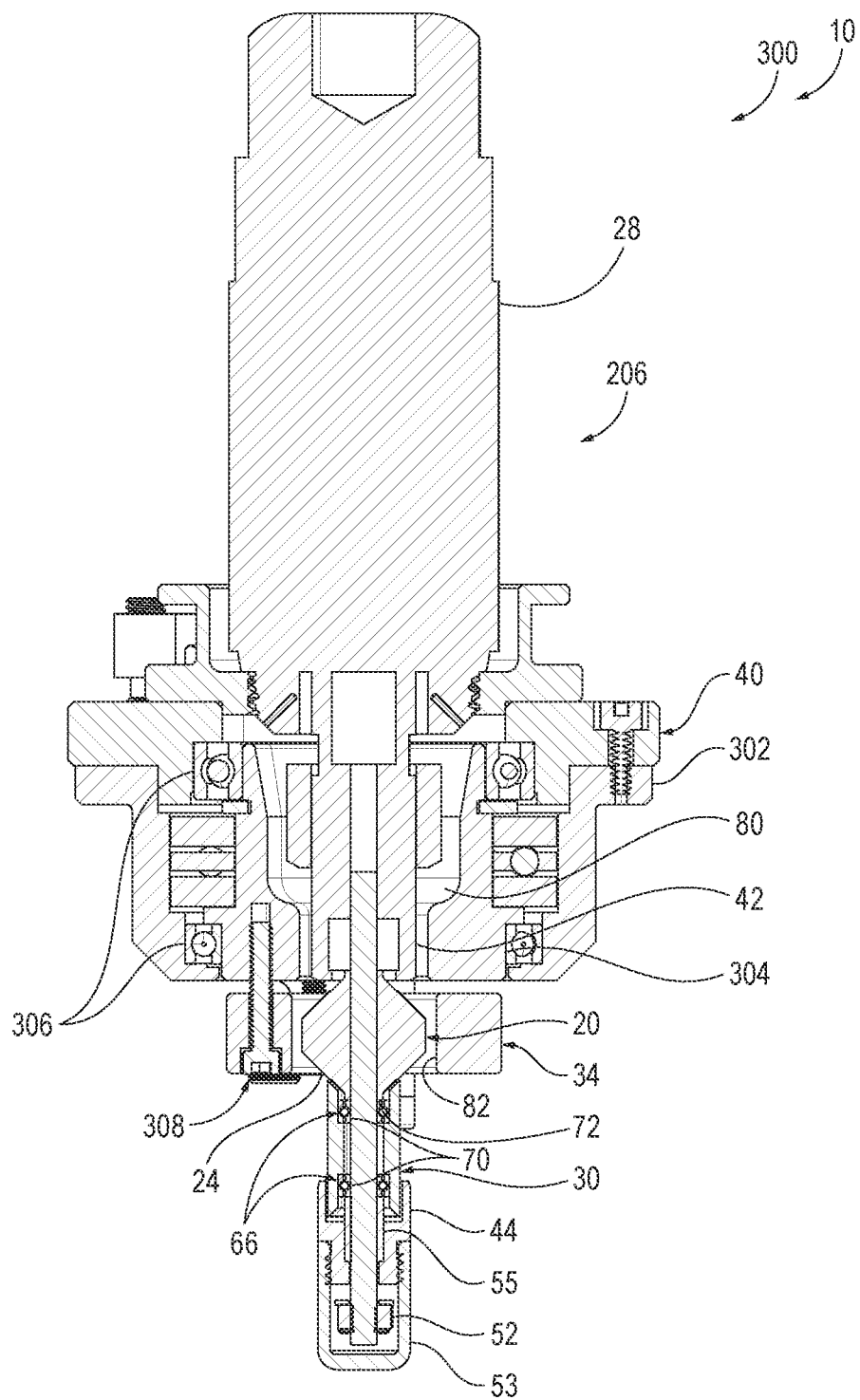
FIG. 5 is a cross-sectional view of the example chamfer-cutting tool of FIG. 4.
Figure 6:
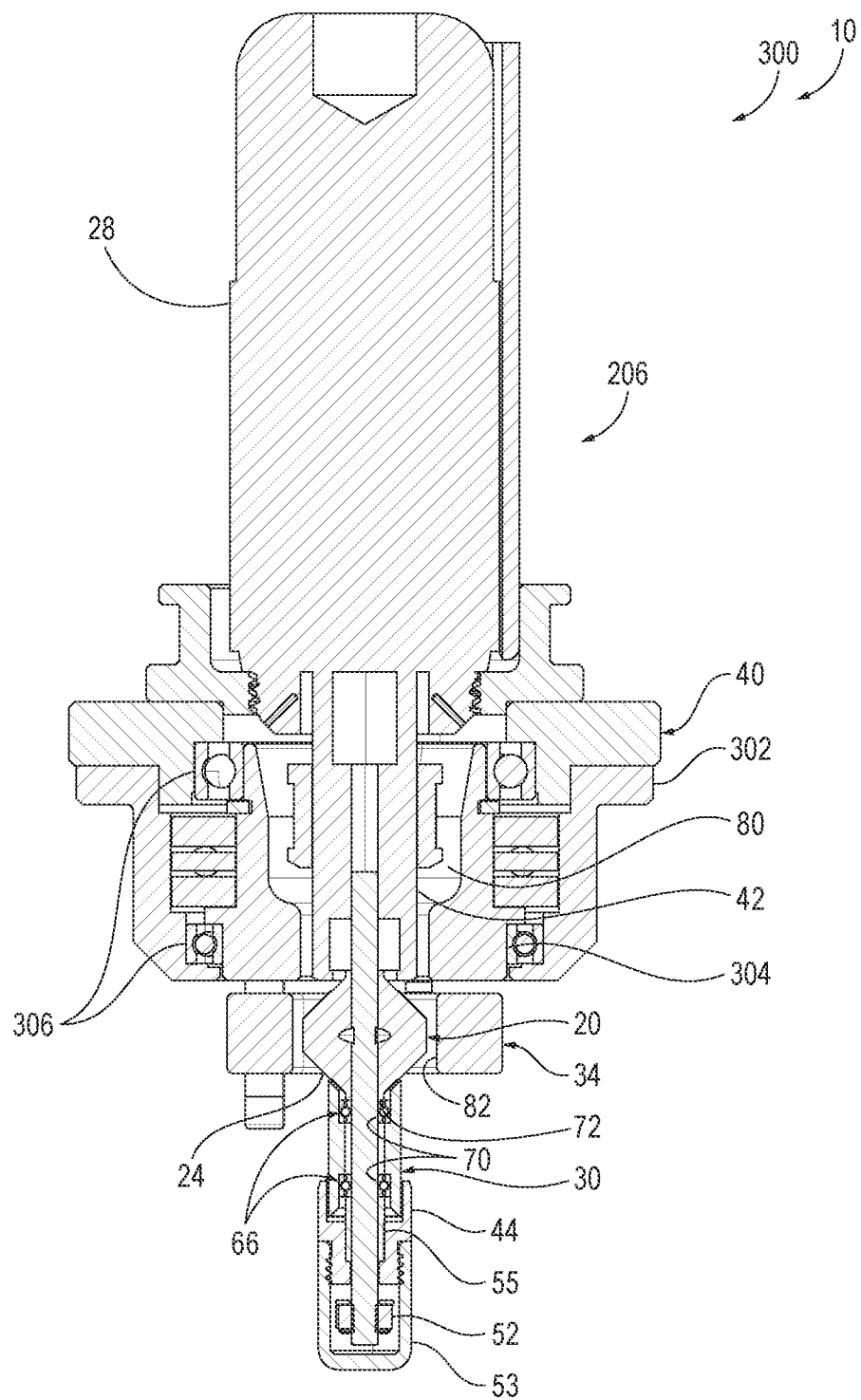
FIG. 6 is a cross-sectional view of the example chamfer-cutting tool of FIG. 4.

FIGS. 4-6 illustrate an example chamfer-cutting tool 10 in the form of chamfer-cutting tool 300, which may be assembled from a chamfer-cutting tool kit 200. As illustrated, chamfer-cutting tool 300 is an example of a chamfer-cutting tool 10 that comprises a router 206, a cutter 20, a bushing 30, an upper-edge guide block 34, a bushing retainer 44, a retainer nut 52, and a cover 53. In addition, as best seen in FIGS. 5 and 6, chamfer-cutting tool 300 further comprises a sleeve 55, the housing 40 of the router 206 defines an air passage 80 for directing airflow from the motor 28 into the upper-edge guide-block passage 82 of the upper-edge guide block 34, the bushing 30 comprises two roller bearings 66, and the cutter 20 defines a shoulder 72 engaged with the inner race 70 of the upper of the two roller bearings 66. Moreover, chamfer-cutting tool 300 is an example of a chamfer-cutting tool 10 whose upper-edge guide block 34 is freely rotatably coupled relative to the motor 28. In particular, the housing 40 of chamfer-cutting tool 300 comprises an outer portion 302 and an inner portion 304 that is freely rotatably coupled to the outer portion 302 by a set of roller bearings 306. The upper-edge guide block 34 is coupled to the inner portion 304 of the housing 40 via a ball screw lock assembly 308, which also facilitates the selective adjustment of the upper-edge guide block 34 relative to the housing 40, and thus the selective adjustment of the chamfer cutting region 38 of the conical cutting surface 24 of the cutter 20.

Figure 7:
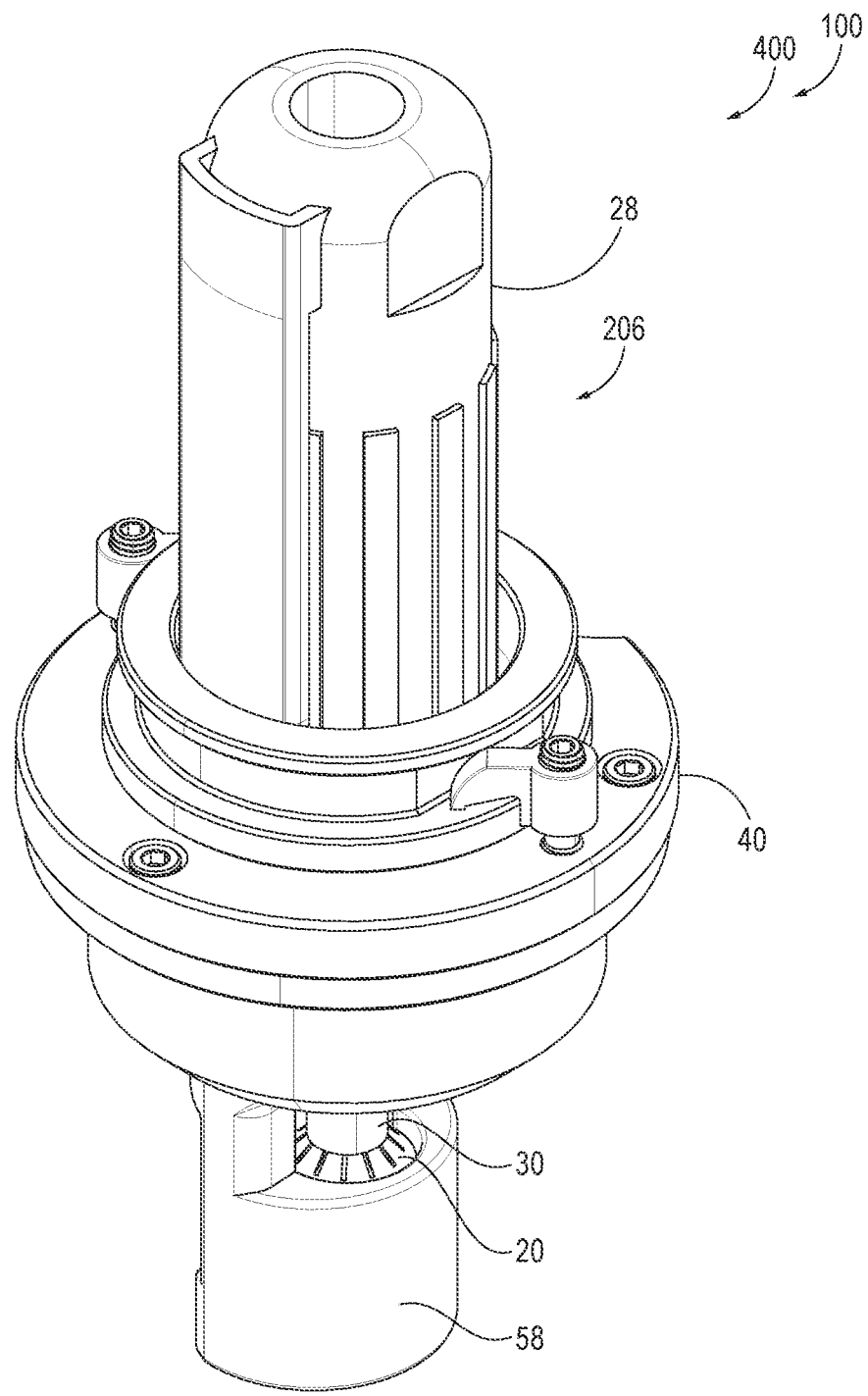
FIG. 7 is a perspective view of an example chamfer-cutting tool.
Figure 8:
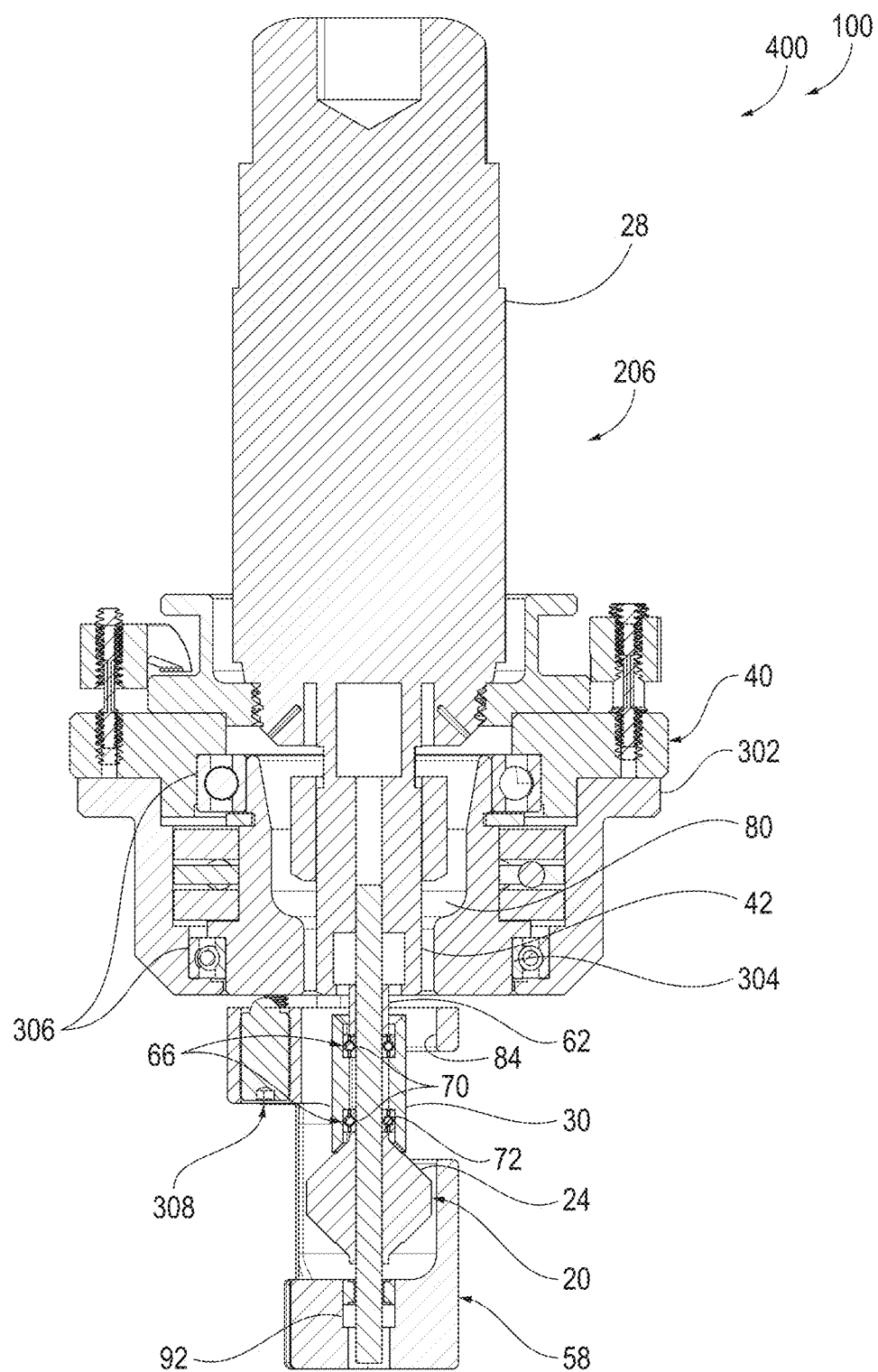
FIG. 8 is a cross-sectional view of the example chamfer-cutting tool of FIG. 7.
Figure 9:
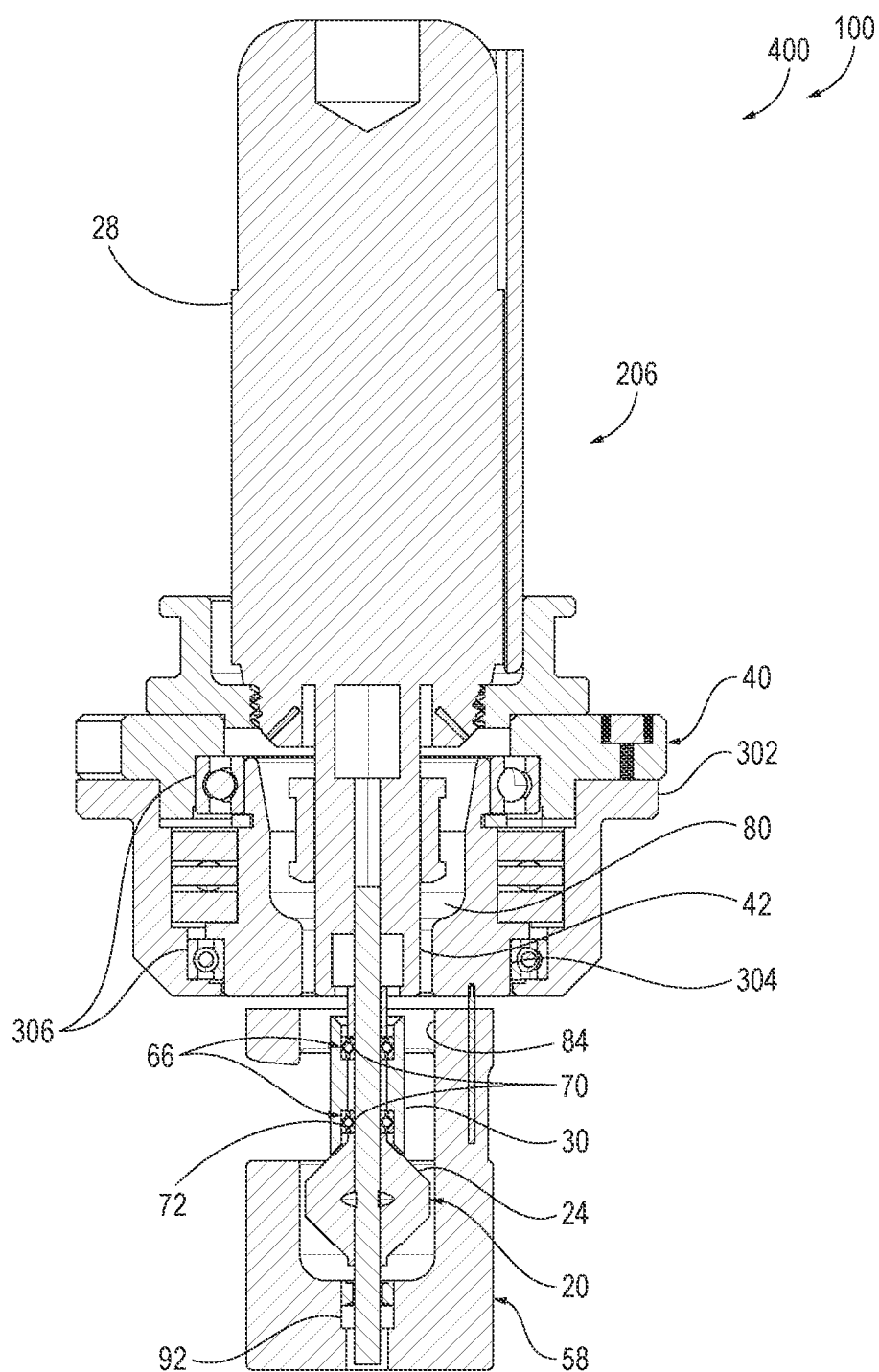
FIG. 9 is a cross-sectional view of the example chamfer-cutting tool of FIG. 7.

FIGS. 7-9 illustrate an example chamfer-cutting tool 100 in the form of chamfer-cutting tool 400, which may be assembled from a chamfer-cutting tool kit 200. As illustrated, chamfer-cutting tool 400 is an example of a chamfer-cutting tool 100 that comprises a router 206, a cutter 20, a bushing 30, and a lower-edge guide block 58. In addition, as best seen in FIGS. 8 and 9, chamfer-cutting tool 400 further comprises a sleeve 62 engaged between the chuck 42 and the inner race 70 of the upper of two bushing roller bearings 66, the housing 40 of the router 206 defines air passages 80 for directing airflow from the motor 28 into the lower-edge guide-block passage 84 of the lower-edge guide block 58, the bushing 30 comprises two bushing roller bearings 66, the cutter 20 defines a shoulder 72 engaged with the inner race 70 of the lower of the two bushing roller bearings 66, and the lower-edge guide block 58 comprises a lower-edge guide-block roller bearing 92. Moreover, chamfer-cutting tool 400 is an example of a chamfer-cutting tool 100 whose lower-edge guide block 58 is freely rotatably coupled relative to the motor 28. In particular, the housing 40 of chamfer-cutting tool 400 comprises an outer portion 302 and an inner portion 304 that is freely rotatably coupled to the outer portion 302 by a set of roller bearings 306. The lower-edge guide block 58 is coupled to the inner portion 304 of the housing 40 via a ball screw lock assembly 308, which also facilitates the selective adjustment of the lower-edge guide block 58 relative to the housing 40, and thus the selective adjustment of the chamfer cutting region 38 of the conical cutting surface 24 of the cutter 20.

Illustrative, non-exclusive examples of inventive subject matter according to the present disclosure are described in the following enumerated paragraphs:

A. A chamfer-cutting tool (10) for cutting an upper chamfer (12) between an upper face (14) of a workpiece (18) and an edge face (16) of the workpiece (18) adjacent to the upper face (14), the chamfer-cutting tool (10) comprising:

a cutter (20) comprising a shaft (22) and a conical cutting surface (24), wherein the shaft (22) comprises a first end (23) and a second end (25) opposite the first end (23), and wherein the shaft (22) defines a cutter rotation axis (26) and is configured to be operatively coupled to a motor (28);

a bushing (30) rotatably coupled to the shaft (22) between the conical cutting surface (24) and the second end (25) of the shaft (22) and comprising an outer cylindrical contact surface (32) configured to engage and operatively roll along the edge face (16) of the workpiece (18); and an upper-edge guide block (34) comprising an upper-face guide surface (36) configured to engage the upper face (14) of the workpiece (18), wherein the upper-edge guide block (34) is configured to be selectively positioned along the cutter rotation axis (26) relative to the conical cutting surface (24) of the cutter (20) and relative to the outer cylindrical contact surface (32) of the bushing (30) to selectively define a chamfer cutting region (38) of the conical cutting surface (24) between the upper-face guide surface (36) and the outer cylindrical contact surface (32) of the bushing (30).

A1. The chamfer-cutting tool (10) of paragraph A, wherein the upper-edge guide block (34) defines an upper-edge guide-block passage (82), and wherein the cutter (20) extends through the upper-edge guide-block passage (82).

A2. The chamfer-cutting tool (10) of any of paragraphs A-A1,
wherein the bushing (30) comprises:
  a bushing body (64); and
  at least one bushing roller bearing (66) comprising an outer race (68) engaged with the bushing body (64) and an inner race (70) engaged with the shaft (22) of the cutter (20); and
wherein the cutter (20) defines a shoulder (72) engaged with the inner race (70) of the at least one bushing roller bearing (66) to prevent the cutting surface (24) from engaging the bushing body (64).

A3. The chamfer-cutting tool (10) of any of paragraphs A-A2, further comprising:
the motor (28) operatively coupled to the first end (23) of the shaft (22); and
a housing (40) that operatively supports the motor (28), wherein the upper-edge guide block (34) is coupled to the housing (40) and is configured to be selectively translated toward and away from the housing (40) along the cutter rotation axis (26) to define the chamfer cutting region (38) of the conical cutting surface (24).

A3.1. The chamfer-cutting tool (10) of paragraph A3, further comprising a chuck (42) operatively coupled to the motor (28) and configured to selectively and operatively engage the shaft (22) for operative rotation of the cutter (20) by the motor (28).

A3.2. The chamfer-cutting tool (10) of any of paragraphs A3-A3.1, wherein the housing (40) defines one or more air passages (80) configured to direct airflow from the motor (28) toward the workpiece (18).

A3.2.1. The chamfer-cutting tool (10) of paragraph A3.2, wherein the one or more air passages (80) are configured to direct airflow from the motor (28) into a/the upper-edge guide-block passage (82) of the upper-edge guide block (34).

A3.3. The chamfer-cutting tool (10) of any of paragraphs A3-A3.2.1, further comprising a frame (86) configured to operatively support the housing (40) to operatively position the chamfer-cutting tool (10) relative to the workpiece (18).

A3.3.1. The chamfer-cutting tool (10) of paragraph A3.3, wherein the frame (86) comprises one or more rollers (88) configured to operatively engage the workpiece (18) to maintain the conical cutting surface (24) in operative engagement with the workpiece (18).

A4. The chamfer-cutting tool (10) of any of paragraphs A-A3.3.1, further comprising a bushing retainer (44) operatively coupled to the shaft (22) and configured to retain the bushing (30) in a fixed positioned along the cutter rotation axis (26) relative to the cutter (20).

A4.1. The chamfer-cutting tool (10) of paragraph A4, wherein the bushing retainer (44) comprises:
a retainer body (46) that defines a bushing cavity (48) sized to receive a lower portion (50) of the bushing (30); and
a retainer nut (52) operatively coupled with the shaft (22) and configured to urge the retainer body (46) against the bushing (30) and thereby urge the bushing (30) toward the cutter (20).

A4.2. The chamfer-cutting tool (10) of any of paragraphs A4-A4.1, further comprising a sleeve (55) configured to position the bushing retainer (44) relative to the bushing (30).

A4.2.1. The chamfer-cutting tool (10) of paragraph A4.2, wherein the bushing (30) comprises:
a/the bushing body (64); and
a/the at least one bushing roller bearing (66) comprising an/the outer race (68) engaged with the bushing body (64) and an/the inner race (70) engaged with the sleeve (55).

A4.3. The chamfer-cutting tool (10) of any of paragraphs A4-A4.2.1, further comprising a cover (53) configured to be selectively positioned over the second end (25) of the shaft (22) of the cutter (20), optionally wherein the cover (53) is configured to be selectively coupled to a/the retainer body (46).

A5. The chamfer-cutting tool (10) of any of paragraphs A-A4.3, wherein the chamfer-cutting tool (10) is further for cutting a lower chamfer (54) between the edge face (16) of the workpiece (18) and a lower face (56) of the workpiece (18) adjacent to the edge face (16) and opposite the upper face (14), wherein the upper-edge guide block (34) is configured to be selectively removed from the cutter (20), and wherein the chamfer-cutting tool (10) further comprises:
a lower-edge guide block (58) comprising a lower-face guide surface (60) configured to engage the lower face (56) of the workpiece (18), wherein the lower-edge guide block (58) is configured to be selectively positioned along the cutter rotation axis (26) relative to the conical cutting surface (24) of the cutter (20) and relative to the outer cylindrical contact surface (32) of the bushing (30) to selectively define a second chamfer cutting region (38) of the conical cutting surface (24) between the lower-face guide surface (60) and the outer cylindrical contact surface (32) of the bushing (30).

A5.1. The chamfer-cutting tool (10) of paragraph A5, wherein the lower-edge guide block (58) defines a lower-edge guide-block passage (84) through which the cutter (20) is configured to extend.

A5.2. The chamfer-cutting tool (10) of any of paragraphs A5-A5.1, further comprising a (second) sleeve (62)

configured to receive the shaft (22) of the cutter (20) and engage the bushing (30) to position the bushing (30) relative to a/the chuck (42), the motor (28), and/or a/the housing (40) of the chamfer-cutting tool (10).

A5.2.1. The chamfer-cutting tool (10) of paragraph A5.2, wherein the bushing (30) comprises:
a/the bushing body (64); and
a/the at least one bushing roller bearing (66) comprising an/the outer race (68) engaged with the bushing body (64) and an/the inner race (70) engaged with the shaft (22) of the cutter (20); and
wherein the (second) sleeve (62) is configured to engage the inner race (70) to operatively position the bushing (30) relative to the chuck (42), the motor (28), and/or the housing (40) of the chamfer-cutting tool (10).

A5.3. The chamfer-cutting tool (10) of any of paragraphs A5-A5.2.1, wherein the lower-edge guide block (58) comprises:
a lower-edge guide-block body (90); and
at least one lower-edge guide-block roller bearing (92), wherein the at least one lower-edge guide-block roller bearing (92) is configured to rotatably couple the lower-edge guide-block body (90) to the shaft (22) of the cutter (20).

B. A chamfer-cutting tool (100) for cutting a lower chamfer (54) between a lower face (56) of a workpiece (18) and an edge face (16) of the workpiece (18) adjacent to the lower face (56), the chamfer-cutting tool (10) comprising:
a cutter (20) comprising a shaft (22) and a conical cutting surface (24), wherein the shaft (22) comprises a first end (23) and a second end (25) opposite the first end (23), and wherein the shaft (22) defines a cutter rotation axis (26) and is configured to be operatively coupled to a motor (28);
a bushing (30) rotatably coupled to the shaft (22) between the conical cutting surface (24) and the first end (23) of the shaft (22) and comprising an outer cylindrical contact surface (32) configured to engage and operatively roll along the edge face (16) of the workpiece (18); and
a lower-edge guide block (58) comprising a lower-face guide surface (60) configured to engage the lower face (56) of the workpiece (18), wherein the lower-edge guide block (58) is configured to be selectively positioned along the cutter rotation axis (26) relative to the conical cutting surface (24) of the cutter (20) and relative to the outer cylindrical contact surface (32) of the bushing (30) to selectively define a chamfer cutting region (38) of the conical cutting surface (24) between the lower-face guide surface (60) and the outer cylindrical contact surface (32) of the bushing (30).

B1. The chamfer-cutting tool (100) of paragraph B, wherein the lower-edge guide block (58) defines a lower-edge guide-block passage (84), and wherein the cutter (20) extends through the lower-edge guide-block passage (84).

B2. The chamfer-cutting tool (100) of any of paragraphs B-B1,
wherein the bushing (30) comprises:
a bushing body (64); and
at least one bushing roller bearing (66) comprising an outer race (68) engaged with the bushing body (64) and an inner race (70) engaged with the shaft (22) of the cutter (20); and
wherein the cutter (20) defines a shoulder (72) engaged with the inner race (70) of the at least one bushing roller bearing (66) to prevent the conical cutting surface (24) from engaging the bushing body (64).

B3. The chamfer-cutting tool (100) of any of paragraphs B-B2, further comprising:
the motor (28) operatively coupled to the second end (25) of the shaft (22); and
a housing (40) that operatively supports the motor (28), wherein the lower-edge guide block (58) is coupled to the housing (40) and is configured to be selectively translated toward and away from the housing (40) along the cutter rotation axis (26) to define the chamfer cutting region (38) of the conical cutting surface (24).

B3.1. The chamfer-cutting tool (100) of paragraph B3, further comprising a chuck (42) operatively coupled to the motor (28) and configured to selectively and operatively engage the shaft (22) for operative rotation of the cutter (20) by the motor (28).

B3.2. The chamfer-cutting tool (100) of any of paragraphs B3-B3.1, wherein the housing (40) defines one or more air passages (80) configured to direct airflow from the motor (28) toward the workpiece (18).

B3.2.1. The chamfer-cutting tool (100) of paragraph B3.2, wherein the one or more air passages (80) are configured to direct airflow from the motor (28) into a/the lower-edge guide-block passage (84) of the lower-edge guide block (58).

B3.3. The chamfer-cutting tool (100) of any of paragraphs B3-B3.2.1, further comprising a frame (102) configured to operatively support the housing (40) to operatively position the chamfer-cutting tool (100) relative to the workpiece (18).

B3.3.1. The chamfer-cutting tool (100) of paragraph B3.3, wherein the frame (102) comprises one or more rollers (88) configured to operatively engage the workpiece (18) to maintain the conical cutting surface (24) in operative engagement with the workpiece (18).

B4. The chamfer-cutting tool (100) of any of paragraphs B-B3.3.1, further comprising a sleeve (62) configured to position the bushing (30) relative to a/the chuck (42), the motor (28), and/or a/the housing (40) of the chamfer-cutting tool (100).

B4.1. The chamfer-cutting tool (100) of paragraph B4, wherein the bushing (30) comprises:
a/the bushing body (64); and
a/the at least one bushing roller bearing (66) comprising an/the outer race (68) engaged with the bushing body (64) and an/the inner race (70) engaged with the shaft (22) of the cutter (20); and
wherein the sleeve (62) engages the inner race (70) to operatively position the bushing (30) relative to the chuck (42), the motor (28), and/or the housing (40) of the chamfer-cutting tool (100).

B5. The chamfer-cutting tool (100) of any of paragraphs B-B4.1, wherein the lower-edge guide block (58) comprises:
a lower-edge guide-block body (90); and
at least one lower-edge guide-block roller bearing (92), wherein the at least one lower-edge guide-block roller bearing (92) rotatably couples the lower-edge guide-block body (90) to the shaft (22) of the cutter (20).

B6. The chamfer-cutting tool (100) of any of paragraphs B-B5, wherein the chamfer-cutting tool (100) is further for cutting an upper chamfer (12) between an upper face (14) of the workpiece (18) and the edge face (16) of the workpiece (18) adjacent to the upper face (14) and opposite the lower face (56), wherein the lower-edge guide block (58) is configured to be selectively removed from relative to the cutter (20), and wherein the chamfer-cutting tool (100) further comprises:
an upper-edge guide block (34) comprising an upper-face guide surface (36) configured to engage the upper face (14) of the workpiece (18), wherein the upper-edge guide block (34) is configured to be selectively positioned along the cutter rotation axis (26) relative to the conical cutting surface (24) of the cutter (20) and relative to the outer cylindrical contact surface (32) of the bushing (30) to selectively define a second chamfer cutting region (38) of the conical cutting surface (24) between the upper-face guide surface (36) and the outer cylindrical contact surface (32) of the bushing (30).

B6.1. The chamfer-cutting tool (100) of paragraph B6, wherein the upper-edge guide block (34) defines an upper-edge guide-block passage (82) through which the cutter (20) is configured to extend.

B6.2. The chamfer-cutting tool (100) of any of paragraphs B6-B6.1,
wherein the bushing (30) comprises:
a/the bushing body (64); and
a/the at least one bushing roller bearing (66) comprising an/the outer race (68) engaged with the bushing body (64) and an/the inner race (70) engaged with the shaft (22) of the cutter (20); and
wherein the cutter (20) defines a shoulder (72) configured to be engaged with the inner race (70) of the at least one bushing roller bearing (66) to prevent the cutting surface (24) from engaging the bushing body (64).

B6.3. The chamfer-cutting tool (100) of any of paragraphs B6-B6.2, further comprising a bushing retainer (44) configured to be operatively coupled to the shaft (22) to retain the bushing (30) in a fixed positioned along the cutter rotation axis (26) relative to the cutter (20).

B6.3.1. The chamfer-cutting tool (100) of paragraph B6.3, wherein the bushing retainer (44) comprises:
a retainer body (46) that defines a bushing cavity (48) sized to receive a lower portion (50) of the bushing (30); and
a retainer nut (52) configured to be operatively coupled with the shaft (22) to urge the retainer body (46) against the bushing (30) and thereby urge the bushing (30) toward the cutter (20).

B6.3.2. The chamfer-cutting tool (100) of any of paragraphs B6.3-B6.3.1, further comprising a (second) sleeve (55) configured to position the bushing retainer (44) relative to the bushing (30).

B6.3.2.1. The chamfer-cutting tool (100) of paragraph B6.3.2, wherein the bushing (30) comprises:
a/the bushing body (64); and
a/the at least one bushing roller bearing (66) comprising an/the outer race (68) configured to engage the bushing body (64) and an/the inner race (70) configured to engage the (second) sleeve (55).

B6.3.3. The chamfer-cutting tool (100) of any of paragraphs B6.3-B6.3.2.1, further comprising a cover (53) configured to be selectively positioned over the second end (25) of the shaft (22) of the cutter (20), optionally wherein the cover (53) is configured to be selectively coupled to a/the retainer body (46).

C. A chamfer-cutting tool kit (200), wherein the chamfer-cutting tool kit (200) is configured to be selectively assembled into an upper-chamfer configuration (202) for cutting an upper chamfer (12) between an upper face (14) of a workpiece (18) and an edge face (16) of the workpiece (18) adjacent to the upper face (14), and wherein the chamfer-cutting tool kit (200) is further configured to be selectively assembled into a lower-chamfer configuration (204) for cutting a lower chamfer (54) between the edge face (16) of the workpiece (18) and a lower face (56) of the workpiece (18) adjacent to the edge face (16) and opposite the upper face (14), the chamfer-cutting tool kit (200) comprising:
a cutter (20) comprising a shaft (22) and a conical cutting surface (24), wherein the shaft (22) comprises a first end (23) and a second end (25) opposite the first end (23), and wherein the shaft (22) defines a cutter rotation axis (26), wherein the first end (23) is configured to be operatively coupled to a motor (28) when the chamfer-cutting tool kit (200) is assembled into the upper-chamfer configuration (202), and wherein the second end (25) is configured to be operatively coupled to the motor (28) when the chamfer-cutting tool kit (200) is assembled into the lower-chamfer configuration (204);
a bushing (30) comprising an outer cylindrical contact surface (32) configured to engage and operatively roll along the edge face (16) of the workpiece (18), wherein the bushing (30) is configured to be rotatably coupled to the shaft (22) between the conical cutting surface (24) and the second end (25) of the shaft (22) when the chamfer-cutting tool kit (200) is assembled into the upper-chamfer configuration (202) and when the chamfer-cutting tool kit (200) is assembled into the lower-chamfer configuration (204);
an upper-edge guide block (34) configured to be selectively coupled relative to the cutter (20) when the chamfer-cutting tool kit (200) is assembled into the upper-chamfer configuration (202), wherein the upper-edge guide block (34) comprises an upper-face guide surface (36) configured to engage the upper face (14) of the workpiece (18), wherein the upper-edge guide block (34) is configured to be selectively positioned along the cutter rotation axis (26) relative to the conical cutting surface (24) of the cutter (20) and relative to the outer cylindrical contact surface (32) of the bushing (30) to selectively define a first chamfer cutting region (38) of the conical cutting surface (24) between the upper-face guide surface (36) and the outer cylindrical contact surface (32) of the bushing (30); and
a lower-edge guide block (58) configured to be selectively coupled relative to the cutter (20) when the chamfer-cutting tool kit (200) is assembled into the lower-chamfer configuration (204), wherein the lower-edge guide block (58) comprises a lower-face guide surface (60) configured to engage the lower face (56) of the workpiece (18), wherein the lower-edge guide block (58) is configured to be selectively positioned along the cutter rotation axis (26) relative to the conical cutting surface (24) of the cutter (20) and relative to the outer cylindrical contact surface (32) of the bushing (30) to selectively define a second chamfer cutting region (38) of the conical cutting surface (24) between the lower-face guide surface (60) and the outer cylindrical contact surface (32) of the bushing (30).

C1. The chamfer-cutting tool kit (200) of paragraph C, further comprising:
the motor (28); and
a housing (40) that operatively supports the motor (28), wherein the upper-edge guide block (34) is coupled to the housing (40) and is configured to be selectively translated toward and away from the housing (40) along the cutter rotation axis (26) to define the first chamfer cutting region (38) of the conical cutting surface (24) when the chamfer-cutting tool kit (200) is assembled into the upper-chamfer configuration (202), and wherein the lower-edge guide block (58) is coupled to the housing (40) and is configured to be selectively translated toward and away from the housing (40) along the cutter rotation axis (26) to define the second chamfer cutting region (38) of the conical cutting surface (24) when the chamfer-cutting tool kit (200) is assembled into the lower-chamfer configuration (204).

C1.1. The chamfer-cutting tool kit (200) of paragraph C1, further comprising a chuck (42) operatively coupled to the motor (28) and configured to selectively and operatively engage the shaft (22) for operative rotation of the cutter (20) by the motor (28).

C1.2. The chamfer-cutting tool kit (200) of any of paragraphs C1-C1.1, wherein the housing (40) defines one or more air passages (80) configured to direct airflow from the motor (28) toward the workpiece (18).

C1.2.1. The chamfer-cutting tool kit (200) of paragraph C1.2, wherein the one or more air passages (80) are configured to direct airflow from the motor (28) into an upper-edge guide-block passage (82) of the upper-edge guide block (34) when the chamfer-cutting tool kit (200) is assembled into the upper-chamfer configuration (202) and into a lower-edge guide-block passage (84) of the lower-edge guide block (58) when the chamfer-cutting tool kit (200) is assembled into the lower-chamfer configuration (204).

C1.3. The chamfer-cutting tool kit (200) of any of paragraphs C1-C.2.1, further comprising a frame (86,102) configured to be operatively coupled the housing (40) to operatively position a chamfer-cutting tool (10,100) assembled from the chamfer-cutting tool kit (200) relative to the workpiece (18).

C1.3.1. The chamfer-cutting tool kit (200) of paragraph C1.3, wherein the frame (86,102) comprises one or more rollers (88) configured to operatively engage the workpiece (18) to maintain the conical cutting surface (24) in operative engagement with the workpiece (18).

C2. The chamfer-cutting tool kit (200) of any of paragraphs C-C1.3.1,
wherein the bushing (30) comprises:
 a bushing body (64); and
 at least one bushing roller bearing (66) comprising an outer race (68) engaged with the bushing body (64) and an inner race (70) configured to engage with the shaft (22) of the cutter (20); and
wherein the cutter (20) defines a shoulder (72) configured to engage with the inner race (70) of the at least one bushing roller bearing (66) to prevent the conical cutting surface (24) from engaging the bushing body (64) when the chamfer-cutting tool kit (200) is assembled into the upper-chamfer configuration (202) and when the chamfer-cutting tool kit (200) is assembled into the lower-chamfer configuration (204).

C3. The chamfer-cutting tool kit (200) of any of paragraphs C-C2, wherein the upper-edge guide block (34) defines an/the upper-edge guide-block passage (82), and wherein the cutter (20) extends through the upper-edge guide-block passage (82) when the chamfer-cutting tool kit (200) is assembled into the upper-chamfer configuration (202).

C4. The chamfer-cutting tool kit (200) of any of paragraphs C-C3, further comprising a bushing retainer (44) configured to be operatively coupled to the shaft (22) to retain the bushing (30) in a fixed positioned along the cutter rotation axis (26) relative to the cutter (20) when the chamfer-cutting tool kit (200) is assembled into the upper-chamfer configuration (202).

C4.1. The chamfer-cutting tool kit (200) of paragraph C4, wherein the bushing retainer (44) comprises:
a retainer body (46) that defines a bushing cavity (48) sized to receive a lower portion (50) of the bushing (30); and
a retainer nut (52) configured to be operatively coupled with the shaft (22) to urge the retainer body (46) against the bushing (30) and thereby urge the bushing (30) toward the cutter (20) when the chamfer-cutting tool kit (200) is assembled into the upper-chamfer configuration (202).

C4.2. The chamfer-cutting tool kit (200) of any of paragraphs C4-C4.1, further comprising a sleeve (55) configured to receive the shaft (22) of the cutter (20) and position the bushing retainer (44) relative to the bushing (30) when the chamfer-cutting tool kit (200) is assembled into the upper-chamfer configuration (202).

C4.2.1. The chamfer-cutting tool kit (200) of paragraph C4.2, wherein the bushing (30) comprises:
a/the bushing body (64); and
a/the at least one bushing roller bearing (66) comprising an/the outer race (68) engaged with the bushing body (64) and an/the inner race (70) engaged with the sleeve (55) when the chamfer-cutting tool kit (200) is assembled into the upper-chamfer configuration (202).

C4.3. The chamfer-cutting tool kit (200) of any of paragraphs C4-C4.2.1, further comprising a cover (53) configured to be selectively positioned over the second end (25) of the shaft (22) of the cutter (20) when the chamfer-cutting tool kit (200) is assembled into the upper-chamfer configuration (202).

C5. The chamfer-cutting tool kit (200) of any of paragraphs C-C4.3, wherein the lower-edge guide block (58) defines a/the lower-edge guide-block passage (84), and wherein the cutter (20) extends through the lower-edge guide-block passage (84) when the chamfer-cutting tool kit (200) is assembled into the lower-chamfer configuration (204).

C6. The chamfer-cutting tool (10) of any of paragraphs C-C5, further comprising a (second) sleeve (62) configured to receive the shaft (22) of the cutter (20) and engage the bushing (30) to position the bushing (30) relative to a/the chuck (42), the motor (28), and/or a/the housing (40) of the chamfer-cutting tool (10) when the chamfer-cutting tool kit (200) is assembled into the lower-chamfer configuration (204).

C6.1. The chamfer-cutting tool kit (200) of paragraph C6, wherein the bushing (30) comprises:
 a/the bushing body (64); and
 a/the at least one bushing roller bearing (66) comprising an/the outer race (68) engaged with the bushing body (64) and an/the inner race (70) configured to engage with the shaft (22) of the cutter (20); and
wherein the (second) sleeve (62) is configured to engage the inner race (70) to operatively position the bushing (30) relative to the chuck (42), the motor (28), and/or the housing (40) of the chamfer-cutting tool (10) when the chamfer-cutting tool kit (200) is assembled into the lower-chamfer configuration (204).

C7. The chamfer-cutting tool kit (200) of any of paragraphs C-C6.1, wherein the lower-edge guide block (58) comprises:
a lower-edge guide-block body (90); and
at least one lower-edge guide-block roller bearing (92), wherein the at least one lower-edge guide-block roller bearing (92) is configured to rotatably couple the lower-edge guide-block body (90) to the shaft (22) of the cutter (20) when the chamfer-cutting tool kit (200) is assembled into the lower-chamfer configuration (204).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A chamfer-cutting tool kit, wherein the chamfer-cutting tool kit is configured to be selectively assembled into an upper-chamfer configuration for cutting an upper chamfer between an upper face of a workpiece and an edge face of the workpiece adjacent to the upper face, and wherein the chamfer-cutting tool kit is further configured to be selectively assembled into a lower-chamfer configuration for cutting a lower chamfer between the edge face of the workpiece and a lower face of the workpiece adjacent to the edge face and opposite the upper face, the chamfer-cutting tool kit comprising:

a cutter comprising a shaft and a conical cutting surface, wherein the shaft comprises a first end and a second end opposite the first end, and wherein the shaft defines a cutter rotation axis, wherein the first end is configured to be operatively coupled to a motor when the chamfer-cutting tool kit is assembled into the upper-chamfer configuration, and wherein the second end is configured to be operatively coupled to the motor when the chamfer-cutting tool kit is assembled into the lower-chamfer configuration;

a bushing comprising an outer cylindrical contact surface configured to engage and operatively roll along the edge face of the workpiece, wherein the bushing is configured to be rotatably coupled to the shaft between the conical cutting surface and the second end of the shaft when the chamfer-cutting tool kit is assembled into the upper-chamfer configuration and when the chamfer-cutting tool kit is assembled into the lower-chamfer configuration;

an upper-edge guide block configured to be selectively coupled relative to the cutter when the chamfer-cutting tool kit is assembled into the upper-chamfer configuration, wherein the upper-edge guide block comprises an upper-face guide surface configured to engage the upper face of the workpiece, wherein a position of the upper-edge guide block is configured to be selectively adjusted along the cutter rotation axis relative to the conical cutting surface of the cutter and relative to the outer cylindrical contact surface of the bushing to selectively define a first chamfer cutting region of the conical cutting surface between the upper-face guide surface and the outer cylindrical contact surface of the bushing; and a lower-edge guide block configured to be selectively coupled relative to the cutter when the chamfer-cutting tool kit is assembled into the lower-chamfer configuration, wherein the lower-edge guide block comprises a lower-face guide surface configured to engage the lower face of the workpiece, wherein a position of the lower-edge guide block is configured to be selectively adjusted along the cutter rotation axis relative to the conical cutting surface of the cutter and relative to the outer cylindrical contact surface of the bushing to selectively define a second chamfer cutting region of the conical cutting surface between the lower-face guide surface and the outer cylindrical contact surface of the bushing.

2. The chamfer-cutting tool kit of claim 1, further comprising:

the motor; and a housing that operatively supports the motor, wherein the upper-edge guide block is coupled to the housing and is configured to be selectively translated toward and away from the housing along the cutter rotation axis to define the first chamfer cutting region of the conical cutting surface when the chamfer-cutting tool kit is assembled into the upper-chamfer configuration, and wherein the lower-edge guide block is coupled to the housing and is configured to be selectively translated toward and away from the housing along the cutter rotation axis to define the second chamfer cutting region of the conical cutting surface when the chamfer-cutting tool kit is assembled into the lower-chamfer configuration.

3. The chamfer-cutting tool kit of claim 2, wherein the housing defines one or more air passages configured to direct airflow from the motor toward the workpiece.

4. The chamfer-cutting tool kit of claim 3, wherein the one or more air passages are configured to direct airflow from the motor into an upper-edge guide-block passage of the upper-edge guide block when the chamfer-cutting tool kit is assembled into the upper-chamfer configuration and into a lower-edge guide-block passage of the lower-edge guide block when the chamfer-cutting tool kit is assembled into the lower-chamfer configuration.

5. The chamfer-cutting tool kit of claim 2, further comprising a frame configured to be operatively coupled to the housing to operatively position a chamfer-cutting tool assembled from the chamfer-cutting tool kit relative to the workpiece.

6. The chamfer-cutting tool kit of claim 5, wherein the frame comprises one or more rollers configured to operatively engage the workpiece to maintain the conical cutting surface in operative engagement with the workpiece.

7. The chamfer-cutting tool kit of claim 2, further comprising a chuck operatively coupled to the motor and configured to selectively and operatively engage the shaft for operative rotation of the cutter by the motor.

8. The chamfer-cutting tool kit of claim 7, wherein when the chamfer-cutting tool kit is assembled into the upper-chamfer configuration, the first end of the shaft of the cutting tool is engaged with the chuck.

9. The chamfer-cutting tool kit of claim 7, wherein when the chamfer-cutting tool kit is assembled into the lower-chamfer configuration, the second end of the shaft of the cutting tool is engaged with the chuck.

10. The chamfer-cutting tool kit of claim 1,
wherein the bushing comprises:
a bushing body; and
at least one bushing roller bearing comprising an outer race engaged with the bushing body and
an inner race configured to engage with the shaft of the cutter; and wherein the cutter defines a shoulder configured to engage with the inner race of the at least one bushing roller bearing to prevent the conical cutting surface from engaging the bushing body when the chamfer-cutting tool kit is assembled into the upper-chamfer configuration and when the chamfer-cutting tool kit is assembled into the lower-chamfer configuration.

11. The chamfer-cutting tool kit of claim 1, wherein the upper-edge guide block defines an upper-edge guide-block passage, and wherein the cutter extends through the upper-edge guide-block passage when the chamfer-cutting tool kit is assembled into the upper-chamfer configuration.

12. The chamfer-cutting tool kit of claim 1, further comprising a bushing retainer configured to be operatively coupled to the shaft to retain the bushing in a fixed position along the cutter rotation axis relative to the cutter when the chamfer-cutting tool kit is assembled into the upper-chamfer configuration.

13. The chamfer-cutting tool kit of claim 12, wherein the bushing retainer comprises:
a retainer body that defines a bushing cavity sized to receive a lower portion of the bushing; and
a retainer nut configured to be operatively coupled with the shaft to urge the retainer body against the bushing and thereby urge the bushing toward the cutter when the chamfer-cutting tool kit is assembled into the upper-chamfer configuration.

14. The chamfer-cutting tool kit of claim 12, further comprising a sleeve configured to receive the shaft of the cutter and position the bushing retainer relative to the bushing when the chamfer-cutting tool kit is assembled into the upper-chamfer configuration.

15. The chamfer-cutting tool kit of claim 14, wherein the bushing comprises:
a bushing body; and
at least one bushing roller bearing comprising
an outer race engaged with the bushing body and
an inner race engaged with the sleeve when the chamfer-cutting tool kit is
assembled into the upper-chamfer configuration.

16. The chamfer-cutting tool kit of claim 12, further comprising a cover configured to be selectively positioned over the second end of the shaft of the cutter when the chamfer-cutting tool kit is assembled into the upper-chamfer configuration.

17. The chamfer-cutting tool kit of claim 1, wherein the lower-edge guide block defines a lower-edge guide-block passage, and wherein the cutter extends through the lower-edge guide-block passage when the chamfer-cutting tool kit is assembled into the lower-chamfer configuration.

18. The chamfer-cutting tool kit of claim 1, further comprising a sleeve configured to receive the shaft of the cutter and engage the bushing to position the bushing relative to a chuck, the motor, and/or a housing of the chamfer-cutting tool kit when the chamfer-cutting tool kit is assembled into the lower-chamfer configuration.

19. The chamfer-cutting tool kit of claim 18,
wherein the bushing comprises:
a bushing body; and
at least one bushing roller bearing comprising
an outer race engaged with the bushing body and
an inner race configured to engage with the shaft of the cutter; and
wherein the sleeve is configured to engage the inner race to operatively position the bushing relative to the chuck, the motor, and/or the housing of the chamfer-cutting tool kit when the chamfer-cutting tool kit is assembled into the lower-chamfer configuration.

20. The chamfer-cutting tool kit of claim 1, wherein the lower-edge guide block comprises:
a lower-edge guide-block body; and
at least one lower-edge guide-block roller bearing, wherein the at least one lower-edge guide-block roller bearing is configured to rotatably couple the lower-edge guide-block body to the shaft of the cutter when the chamfer-cutting tool kit is assembled into the lower-chamfer configuration.

* * * * *